(12) United States Patent
Feller et al.

(10) Patent No.: US 6,584,860 B1
(45) Date of Patent: Jul. 1, 2003

(54) FLOW PROBE INSERTION GAUGE

(76) Inventors: Murray F. Feller, 21577 NW. 75th Avenue Rd., Micanopy, FL (US) 32667; Marvin J. Feldman, 123 Bayside Dr., Clearwater, FL (US) 33767

( * ) Notice: Subject to any disclaimer, the term of this patent is extended or adjusted under 35 U.S.C. 154(b) by 0 days.

(21) Appl. No.: 10/047,597

(22) Filed: Jan. 14, 2002

(51) Int. Cl.[7] ................................................ G01F 1/66
(52) U.S. Cl. .................................................. 73/861.25
(58) Field of Search ........................ 73/861.29, 861.31, 73/861.27, 861.22, 861.25, 861.26, 861.28, 861.18; 367/149, 153; 324/207.16, 207.5

(56) References Cited

U.S. PATENT DOCUMENTS

| | | | | |
|---|---|---|---|---|
| 4,103,551 A | * | 8/1978 | Lynnworth ................ | 73/861.27 |
| 4,221,128 A | * | 9/1980 | Lawson et al. ........... | 73/861.29 |
| 4,294,656 A | * | 10/1981 | Beck et al. ................ | 162/192 |
| 4,535,637 A | | 8/1985 | Feller | |
| 4,552,019 A | * | 11/1985 | Freeman ...................... | 73/584 |
| 4,829,833 A | | 5/1989 | Feller | |
| 4,982,383 A | * | 1/1991 | Sims et al. ................ | 367/89 |
| 5,373,487 A | * | 12/1994 | Crawford et al. .......... | 367/149 |
| 6,085,599 A | | 7/2000 | Feller | |
| 6,178,827 B1 | | 1/2001 | Feller | |
| 6,345,539 B1 | * | 2/2002 | Rawes et al. ............ | 73/861.27 |

* cited by examiner

Primary Examiner—Hezron Williams
Assistant Examiner—Jewel V. Thompson
(74) Attorney, Agent, or Firm—David Kiewit (57) ABSTRACT

A significant problem in the flow probe art is that of accurately positioning a flow-sensing portion of the probe at a selected location within a pipe. Several arrangements are provided for determining the insertion depth of flow sensing probes, for measuring diameters of the pipes in which they are inserted, and for detecting the depth of those pipes. These generally involve adding to the flow probe a depth measurement device for generating an energetic beam that is reflected from the pipe or from an insertion fitting. One such sensor uses a phased array of piezoelectric element to serve both in a pulse-echo distance measurement device and in a time-of-flight flow measurement device.

20 Claims, 4 Drawing Sheets

FLOW PROBE INSERTION GAUGE

BACKGROUND OF THE INVENTION

1. Field of the Invention

The present invention relates to methods for determining the insertion depth of flow sensing probes, for measuring diameters of the pipes in which they are inserted and for detecting the fill depth of those pipes.

2. Background Information

Insertion probes for sensing flow rate are typically installed in a pipe using an insertion fitting mounted on the pipe. Compared to the more conventional full bore in-line flow sensors, which sense most, or all, of the fluid flowing through the pipe, these probes typically cost much less to purchase and install, and can be removed and reinstalled with relative case. Their main detriment is a reduction in measurement accuracy which occurs because probes generally sense the flow rate of only a small fraction of the total fluid in the pipe. There is also a potential for additional loss of accuracy if a probe is installed at other than a selected position, if the inside diameter of the pipe is not known accurately, or if the pipe is only partially filled. This invention relates to flow probe improvements for minimizing such accuracy degrading effects.

The flow rate through a round pipe is not the same everywhere through its flow cross section. Moreover, the distribution of local flow rates at the point of measurement also varies with the total volumetric flow rate. However, it is known that sensing the flow rate with a probe set at some selected points (e.g., approximately 11% of the pipe diameter in from the inside surface of the pipe) provides a good estimate of the total volumetric flow rate through the pipe. Deviation from that position is likely to produce additional and unnecessary measurement errors. Hence, arrangements for setting and checking the probe's depth are important. Commercially available means for measuring the depths of some probes consist of linearly graduated portions of the probe's stem or of attached parts that are observed visually. While these arrangements are satisfactory in some applications they are useless in others because of such factors such as poor lighting and cramped quarters during installation. Moreover, because of additional space required for the graduated portion, these probes can not be used in all installations. Because they usually determine penetration depth with respect to a known position of an insertion pipe fitting, these arrangements lead to errors if additional fittings are added during installation and change the distance between the reference point and the center of the pipe. Furthermore, the penetration depth cannot be readily determined remotely for checking the installation, as is often desired when troubleshooting. Hence, a significant problem in the flow probe art is that of accurately positioning a flow-sensing portion of the probe at a predetermined location within a pipe. Although selection of the predetermined location is an important part of flow measurement, it is not part of the present invention.

Insertion flow probes are often mounted on pipes which have been insufficiently or erroneously documented. Unfortunately, this usually occurs with pipes which are partially hidden or thermally insulated. Specifications and/or installation drawings are also often in error as to the internal diameter of the pipes. To counteract this source of flow sensing error a convenient means is required for measuring the internal diameter of the pipe.

It is therefore an object of the present invention to provide means that are essentially integral to the basic flow sensing probe and which enable its penetration depth and the internal diameter of the pipe that it is mounted on to be determined and observed both locally and remotely as desired.

BRIEF SUMMARY OF THE INVENTION

The above and other objects are satisfied with a variety of sensing arrangement, which include both acoustic and optical means that are exemplified in accordance with various preferred embodiments of the present invention.

In one aspect of the invention a flow sensor comprising a flow probe having an insertable end for insertion into a pipe is improved by adding to it a position sensing device adjacent the insertable end of the probe. When in use, a flow sensing device can supply an electrical flow signal responsive to a rate at which a fluid in the pipe flows past a portion of the probe adjacent its insertable end, and the position sensing device can supply an electrical position signal responsive to a distance between the position sensing device and a selected portion of either a portion of the pipe or a portion of a probe insertion fitting into which the composite probe is inserted.

A feature of the invention is that it provides a method of positioning a flow probe within a pipe in which a fluid is flowing when an insertable end of the probe is inserted into the fluid through an insertion fitting. The probe, in this case, selectively provides either an electrical flow signal output representative of a rate of flow past a selected portion of the probe adjacent its insertable end or an electrical position signal responsive to a distance between a position sensing device adjacent the insertable end of the probe and either a selected portion of the pipe or a selected portion of the insertion fitting. The method comprises the steps of: a) inserting the insertable end of the probe into the pipe; b) energizing the position sensing device; c) displaying, to an operator, an indication of the measured distance; and d) moving the probe until the indication of distance reaches a selected valued.

Some embodiments of the invention use a transducer array capable of forming a steered beam of acoustic energy for both fluid flow sensing and pulse-echo distance measurement. In apparatus of this sort at least two transducers are mounted adjacent the insertable end of a probe. A first of these transducers comprises at least one transducer element and is selectively operable to generate a first acoustic beam directed at an acoustic transducer array and receive at least a portion of a second acoustic beam generated by the acoustic transducer array and to provide a first time-of-flight flow output responsive to the received beam. The second of these transducers comprises the transducer array, which is selectively operable to: a) generate the second acoustic beam directed at the first acoustic transducer; b) receive at least a portion of the first acoustic beam generated by the first transducer and provide a second time-of-flight flow output therefrom; c) generate a third acoustic beam that is not directed at the first acoustic transducer, but that is rather directed at a portion of the pipe in which the probe is installed; and d) receive a portion of the third acoustic beam and provide the pulse-echo output therefrom. Preferred embodiments of this sort provide a reflecting surface portion of the probe situated so that an acoustic beam generated by one or the other of the two transducers is reflected to the other transducer.

A first specific embodiment of the invention comprises a flow sensing turbine probe adjacent its insertable end. A probe of this sort is taught in Feller's U.S. Pat. No. 4,829,833, the disclosure of which is herein incorporated by reference. The probe also holds a pulse-echo distance transducer which is periodically activated to produce bursts of acoustic energy directed at an inside surface of the pipe distal from the probe insertion fitting used to mount the sensor. The acoustic echoes are received by the transducer and amplified to produce corresponding electrical pulses. The measurement of the difference in time between the transmitted and received pulses is proportional to the distance separating the transducer and the inside pipe surface across from the transducer. That distance is added to the distance from the transducer to the center of the flow sensing element on the flow probe, the total then being subtracted from the known inside diameter of the pipe to yield the insertion depth. This addition and subtraction of distances is ideally performed electronically and results in a local or remote display of the net insertion depth. Acoustic sounding techniques for measuring distance as may be found in current art sonar and other acoustic instrumentation are employed.

A second specific embodiment is similar to the first embodiment with the main exception being that the transducer points in the opposite direction (e.g., upwards in the depiction of FIG. 2) to direct its bursts of acoustic energy toward and receive their echoes from the upper inside surface of the pipe. The insertion depth is then determined by adding the acoustically measured distance to the distance between the transducer and center of the flow sensing means of the flow probe. By incorporating two transducers on a single probe, one facing up and the other down, each transducer can measure the distance to the pipe surface that it faces. These distances can be combined along with the known distance between the transducers to yield the pipe diameter. In such an arrangement, it is economical to use a single set of distance measuring electronics which is switched between the two transducers and provides the distance summation.

In a third specific embodiment, an acoustic transducer is located so as to project its acoustic energy and receive the echoes in a direction generally along an axis of the pipe. As the probe is inserted into the pipe through a probe insertion fitting this results in the reception of very strong, short transit time echoes that are abruptly followed by very weak, long transit time echoes when the transducer moves from the insertion fitting into the pipe and the pulse-echo acoustic energy travels across the length of the pipe rather than being promptly reflected back by the pipe at its opening or by the associated fittings. The insertion location corresponding to that change in the echo characteristics is then a reference point from which the insertion depth may be determined. Electronics incorporating distance measuring principles may be incorporated here. However, the electronics may also be simplified to detect only the change in echo magnitude as a linear measurement is no longer needed once the reference point has been determined.

A fourth specific embodiment is similar in principle to the third preferred embodiment, but photoelectric rather than acoustic energy is used for the distance sensing. Here, a photoelectric emitter and detector are employed either directly at the flow sensing location or remotely through fiber optics to detect the change in reflection intensity of the emitted photo energy as the probe is inserted and the emitter-detector pair pass from the probe insertion fitting into the pipe.

Figure 1:
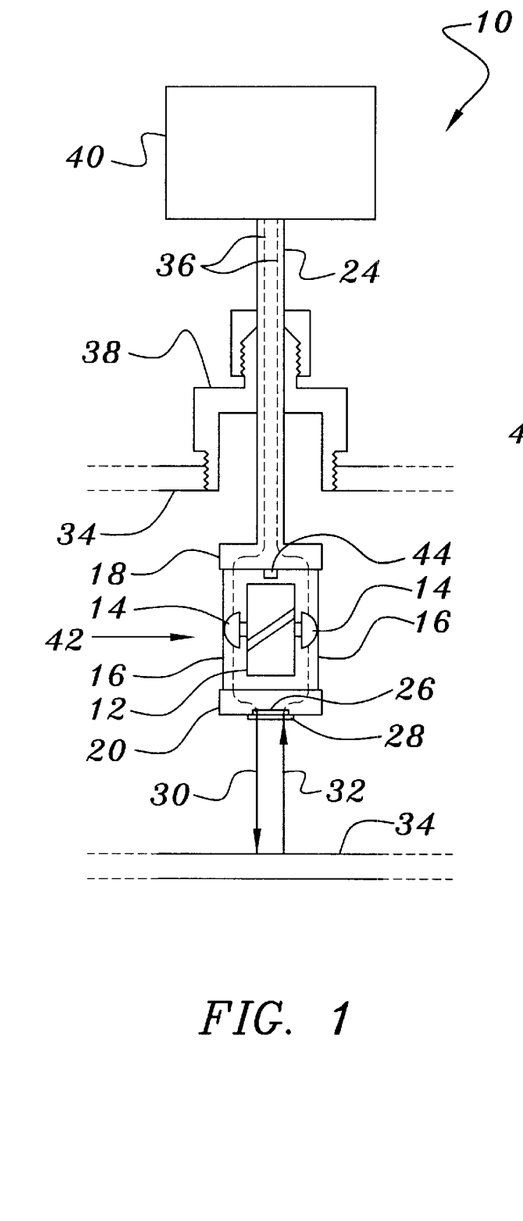
FIG. 1 illustrates a simplified side cross-sectional view of a preferred embodiment of the flow probe insertion gauge having a bottom distance sensor.

A fifth specific embodiment utilizes one of the already existing transducers in an acoustic transit time flow sensing probe that operates as described in the Feller's U.S. Pat. No. 6,178,827, the disclosure of which is herein incorporated by reference. In this embodiment the selected transducer is temporarily disconnected from the flow rate measurement electronics when a distance measurement is desired and connected instead to the distance measuring electronics as in the first embodiment. The probe's acoustic reflector 20, of FIG. 1, is made as narrow as possible consistent with good flow rate measurement, in order to pose the least interference with the acoustic waves being directed to and received from the pipe wall. The reflector may also be offset from center to further clear the path between the transducer and wall, although the reflector is angled slightly for maximum acoustic reflection of the acoustic energy between the transducers as required when measuring flow rate. The transducer angles may also be selected in order to achieve the best compromise in acoustic energy propagation efficiency between the two modes of operation. The operating frequency for distance measurement may also be changed to widen or distort its acoustic projection and to reduce fluid attenuation losses so that a larger portion of that energy returns as an echo from the pipe to the transducer. An echo will be present from the acoustic energy reflecting off the other transducer which may be suppressed by nullifying the magnitude of that signal as a preset since its magnitude and time of occurrence is highly consistent.

The present invention is compatible with different types of flow sensing probes because it can operate independent of the flow sensing method employed and requires little space for its implementation. Some examples of the types of flow probes for which it is applicable may be found in the Feller U.S. Pat. Nos. 4,399,696, 4,535,637, 4,829,833, 6,085,599 and 6,178,827.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

The various advantages of the present invention will become apparent to one skilled in the art by reading the following specification and subjoined claims and by referencing the following drawings in which:

DETAILED DESCRIPTION OF THE INVENTION

Several embodiments of the invention are depicted in various figures of the drawing. A common setting showing a transducer probe inserted through a probe insertion fitting 38 extending upwards from the top of a pipe has been selected for these figures as a matter of convenience. Those skilled in the art will recognize that other insertion orientations may equally well be used. Moreover, directional terms, such as "up" and "down" in the subsequent disclosure are used to with reference to the drawing orientation in the interest of more clearly explaining the invention, and are not to be taken as limiting the invention to any particular depicted setting.

Referring to FIG. 1, a flow sensor 10 in accordance with a preferred embodiment of the present invention is shown as it would be typically mounted in a pipe 34. A rotatable turbine element 12 is suspended in the fluid flow, the direction of which is indicated by arrow 42, by supports 14 which are located between posts 16. The posts are attached between the upper 18, and lower 20 mounts, respectively. An acoustic transducer 26, attached to the lower mount in the depiction of FIG. 1, is arranged to project an acoustic energy beam through a protective window 28 and across the pipe from the probe insertion fitting 38—i.e., downwards, as indicated by arrow 30, in the depiction of FIG. 1. The acoustic transducer 26 also receives an echo, indicated by the upwardly directed arrow 32. The upper mount contains a component, the pickup electrode 44 for example, of the turbine rotation detecting means as further exemplified in the Feller U.S. Pat. No. 4,829,833. The upper mount is attached to a stem 24 which passes through the probe insertion fitting 38 to the electronics enclosure 40 where the electronics circuits used in the flow sensing and depth sensing functions are located. Wires 36, shown dotted, connect the transducer to the supporting electronics.

During pulse-echo operation to sense insertion depth, the acoustic transducer 26 transmits a burst of acoustic energy directly down to the pipe wall and receives the return echo, the time interval between the transmission and reception of the acoustic energy being a measure of the distance between the transducer and the wall. That distance is added to the distance between the transducer and the center of the turbine element, and the subtotal is then subtracted from the inside pipe diameter to provide the insertion depth. The above computation and resultant display of the results is easily performed with current art electronics so that a visual indication is readily available to personnel installing the probe. The distance data may also be readily communicated to remote locations for checking installation. It is further noted that under conditions where the pipe is not filled sufficiently with liquid to complete the acoustic path between the transducer and pipe, a severe loss of echo signal will result which may be detected and used as an alarm function. Further electronic details are provided with reference to FIG. 3.

Figure 1A:
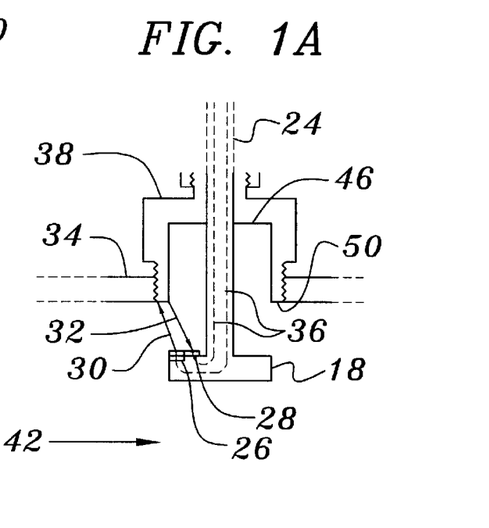
FIG. 1A illustrates the flow probe of FIG. 1 having a top distance sensor.

FIG. 1A illustrates a portion of probe 10 modified by the relocation of the acoustic transducer 26 and window 28 to an edge of that surface of the mount 18 that is closest to the probe insertion fitting 38. The acoustic energy 30 is then projected up to the fitting 38, while the echo 28 travels down to the transducer. This arrangement provides a distance measurement between a reflective surface such as the lower surface 50 of the fitting and the transducer, thereby providing a measure of the insertion depth, particularly if the insertion fitting is installed so as to have its innermost end aligned with the inner surface of the pipe. Those skilled in the art will recognize that reflections from the pipe itself can also be used for the depth measurement, even though the pipe's reflective surfaces are farther from a point directly above the transducer 26. The lower end of the insertion fitting can be rounded to enhance reflection. Skilled artisans will also recognize that distance corrections for the resultant angular offsets can easily be made by means of numerical calculations performed on an output of the depth measurement electronics. Moreover, the transducer may also be located close to the stem 24 and use the upper inside surface 46 of the insertion fitting as the reflecting surface. When the pipe is horizontally oriented and only partially filled with a liquid, the liquid to gas interface typically provides a highly acoustically reflective surface which the present distance measurement invention will readily respond to. The distance will be accurately sensed as the pipe empties as long as sufficient liquid remains for the acoustic path to be maintained. This feature of the invention enables flow rate measurement corrections to be made when a less than full pipe condition exists and to also provides a partial fill alarm function.

Figure 1B:
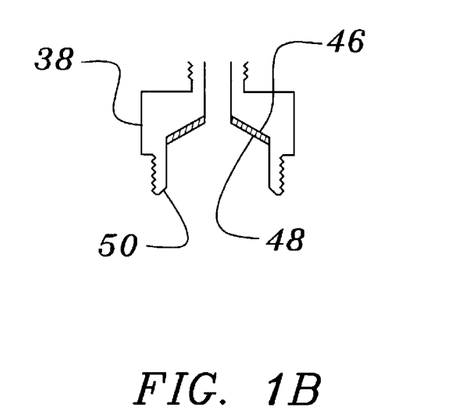
FIG. 1B illustrates the pipe attachment fitting details of FIG. 1.

In FIG. 1A, echoes from both the lower, and upper reflective surfaces of the fitting may, as governed by their design and the mechanical aspects of the installation, produce echoes of sufficient magnitude to degrade the distance measurement precision and reliability. This problem can be minimized as illustrated in FIG. 1B by angling the insertion probe's reflective surfaces 50, and 46, and further by the addition of acoustic energy absorbent material 48, such as a closed cell rubber foam or cork.

Figure 1C:
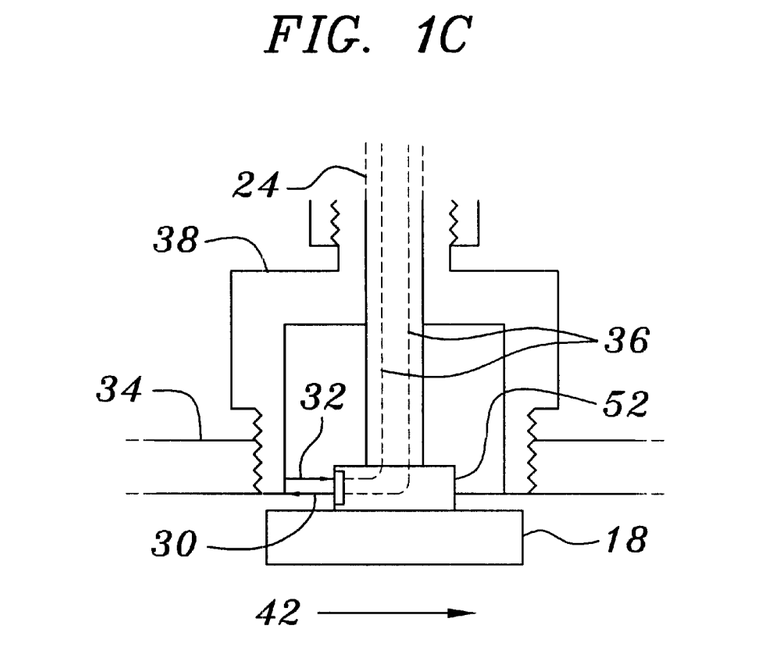
FIG. 1C illustrates the flow probe of FIG. 1 having a side mounted transducer.

In FIG. 1C, the acoustic pulse-echo transducer projects its acoustic energy perpendicular to an axis of the probe (i.e., horizontally in the depiction of FIG. 1C) in order to produce echoes from an opening from either the pipe 34, or the fitting 38. With a small insertion depth of the probe, the acoustic transmissions 30 from the transducer 26 are reflected strongly as echoes 32 from the inside cylindrical surface of fitting 38. As the depth increases, so that less of the energy transmissions are returned as echoes, the received signal strength begins to reduce. With further depth increases, the received signal strength becomes very low and the distance measurement capability of the supporting electronics is no longer able to provide a usable indication because a valid echo signal is not detected. The transition from a usable echo to an insufficient echo depends upon factors such as the acoustic beam angle and the electronic detection characteristics, and can be a sharp one so that the position of the lower edge of the insertion fitting or pipe can be determined with sufficient precision to accurately insert the probe. The change in the magnitude of the echo may also be used directly to determine the lower edge of the fitting or pipe. The insertion location corresponding to an abrupt change in either distance or magnitude thereby becomes a reference point from which the insertion depth may be determined. That change may be made more abrupt by sharpening the beam angle of the transducer which may be accomplished by operating it at a higher frequency.

Figure 1D:
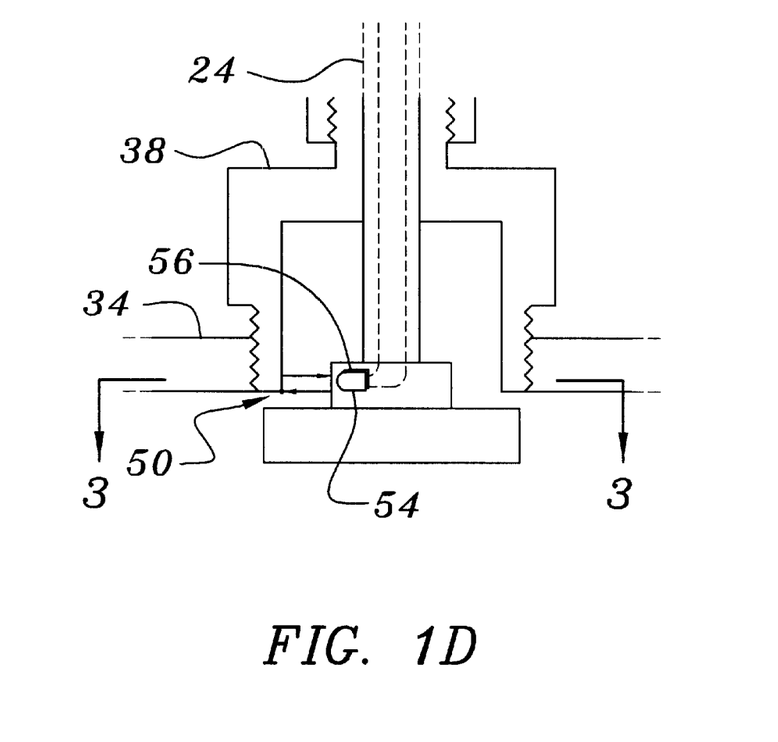
FIG. 1D illustrates the flow probe of FIG. 1 incorporating photoelectric sensing.
Figure 1E:
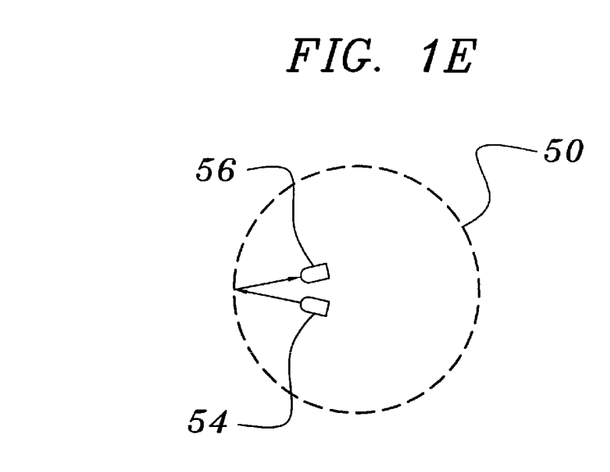
FIG. 1E illustrates the cross sectional view of FIG. 1D, the section taken as indicated with the double headed arrow 3—3 in FIG. 1D.

In FIG. 1D a photoelectric emitter 54, and a photoelectric detector 56 lie in a plane perpendicular to an axis of the probe, as illustrated in FIG. 1E, and provide an edge detecting capability in fundamentally the same way as does the acoustic transducer depicted in FIG. 1C. When the emitter beam impinges largely above the lower edge 50 of the fitting 38, that fitting reflects a portion of the beam energy back to the detector for the detector to produce a relatively high current. When the probe is inserted to a depth where the reflected energy is reduced, the detector current is correspondingly reduced. The insertion location corresponding to an abrupt change in detector current, which is easily discerned with present art electronic circuits. This is a reference point from which the insertion depth may be determined. The emitter and detector can beneficially incorporate lenses to sharpen their beam angles and thereby increase the precision of detecting the lower edge of the fitting. Detection of the lower edge of the pipe 34 opening can also be used to establish the reference point. Fiber optic edge detector augmented emitters and detectors may also be used and have the advantage of enabling the emitter and detector to be installed remote from the flow medium environment. The two fiber optic cables interfacing with the emitter and detector may be merged into a single cable for directing the emitted energy and recovering the reflected energy through a single cable aimed horizontally at the fitting or pipe.

Figure 1F:
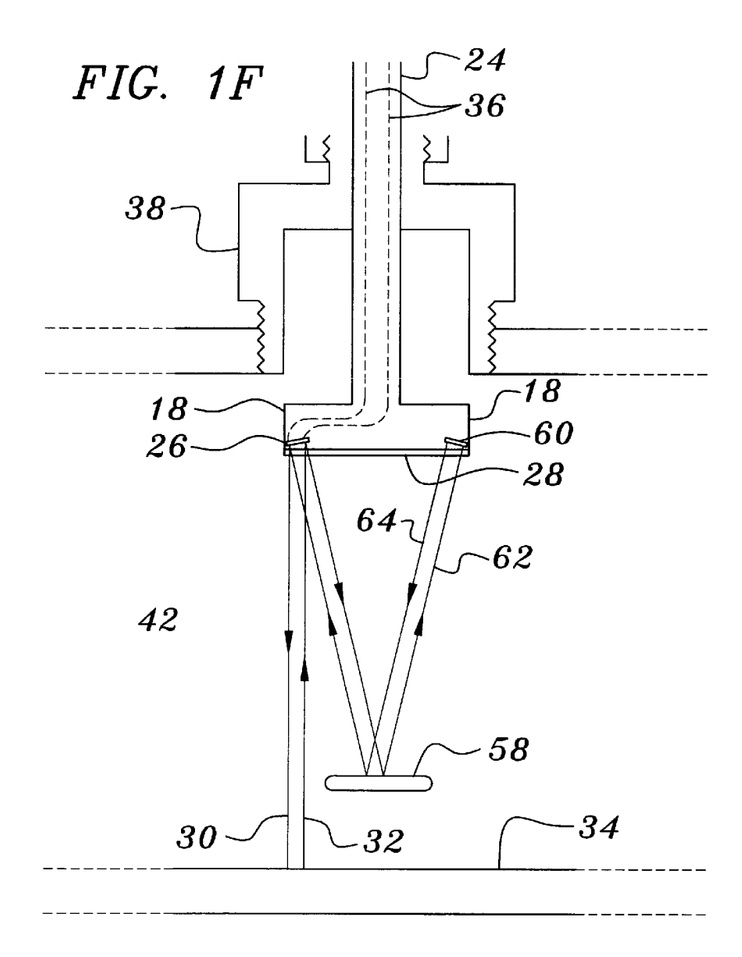
FIG. 1F illustrates a simplified side cross-sectional view of an ultrasonic transit time flow sensor in accordance with a preferred embodiment of the present invention.

FIG. 1F illustrates an ultrasonic transit time flow probe configuration as described in the Feller U.S. Pat. No. 6,178, 827. This transit time flow probe has been adapted to additionally provide a means for determining probe insertion depth. Single element transducers 26 and 60 are angled to optimally transmit and receive acoustic energy through a window 28 and between each other, using a reflector 58, along a path depicted by arrows 62 and 64. One of the transducers 26, is switched as desired, to the distance measuring electronics to determine its distance from the surface of the pipe roughly opposite the point of attachment of the insertion probe. Even though the radiation from the transducer 26 is not a maximum along a pipe diagonal, which is the preferred direction in which the acoustic beam would hit the pipe wall squarely and provide a measurement of the shortest distance, the beam has a component of its normal radiation pattern along the diagonal so that it can also sense the resultant echoes and generate a output. The acoustic reflector 58 may be made as small as practical and may further be offset from a central location between the transducers in order to further clear the direct acoustic path between transducer 26 and the pipe, and minimize reflection from the reflector back to that transducer. Offsetting the reflector will typically require small angular changes to the transducers and the reflector to retain their transmission and reception efficiencies when used for flow rate sensing.

The transmitted acoustic energy levels to the pipe and the resultant electrical signals from the echoes are relatively low because the transducer 26 is not aimed squarely at the pipe, thereby making it more difficult to electronically distinguish between echoes from the pipe and from other surfaces, such as the reflector, and other probe surfaces and the other transducer 60. In this and similar situations, one way to minimize this problem is to electronically reduce the echo signal level when the echo from a known reflector (e.g., transducer 60) is expected to appear so that it will not register as a valid echo. This is practical because both the time interval between the transmitted acoustic signal and the echo from transducer 60, and the magnitude of that echo are easily determined and are constant. Another approach is to operate the pulse echo transducer 26 at a lower frequency when measuring distance in order to broaden the acoustic beam angle of the transducer. This directs a greater portion of the acoustic energy towards the internal surface of the pipe and a stronger echo is received. In order to maintain transducer transmission and reception efficiency at a lower frequency, operation at a resonant frequency is usually desired. For example, a lead zirconate titanate ceramic transducer with the dimensions of 0.020" thickness, 0.125" width and 0.200" length, and having electrodes on the 0.125"×0.200" surfaces, will exhibit resonance at a frequency of about 4.0 MHz in the thickness mode and 640 kHz in the transverse (0.125") mode. The beam width, will tend to widen inversely to the ratio of the resonant frequencies.

Figure 2:
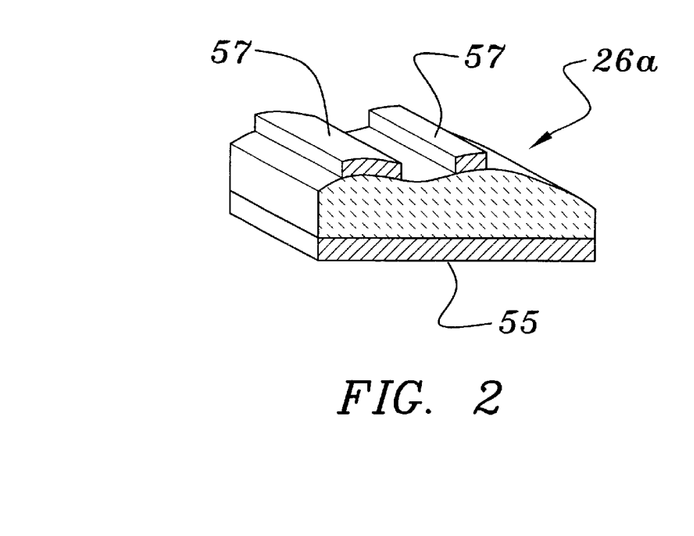
FIG. 2 is a partly sectioned elevational view of a piezoelectric array component usable in an embodiment of the invention employing a steered acoustic beam.

In another embodiment that generally accords with the depiction of FIG. 1F, a transducer array 26a can be used instead of the single element transducer discussed above. The transducer array 26a can be operated as a phased array in ways well known to those skilled in the art so that a phase difference between the transmitted or received signals results in a change in beam direction. The transducer elements that make up the overall transducer 26 may be made from separate pieces of transducer material, or a from single piece of material having different portions selected to accommodate the desired transmitting and receiving functions. The latter configuration is readily accomplished with the ceramic example described above by completely coating one of the 0.125"×0.200" surfaces of a piezoelectric transducer 26a with a common electrode 55 and selectively coating portions of the opposite surface with an array of electrodes 57 corresponding to the areas of the individual elements of the desired array.

Figure 3:
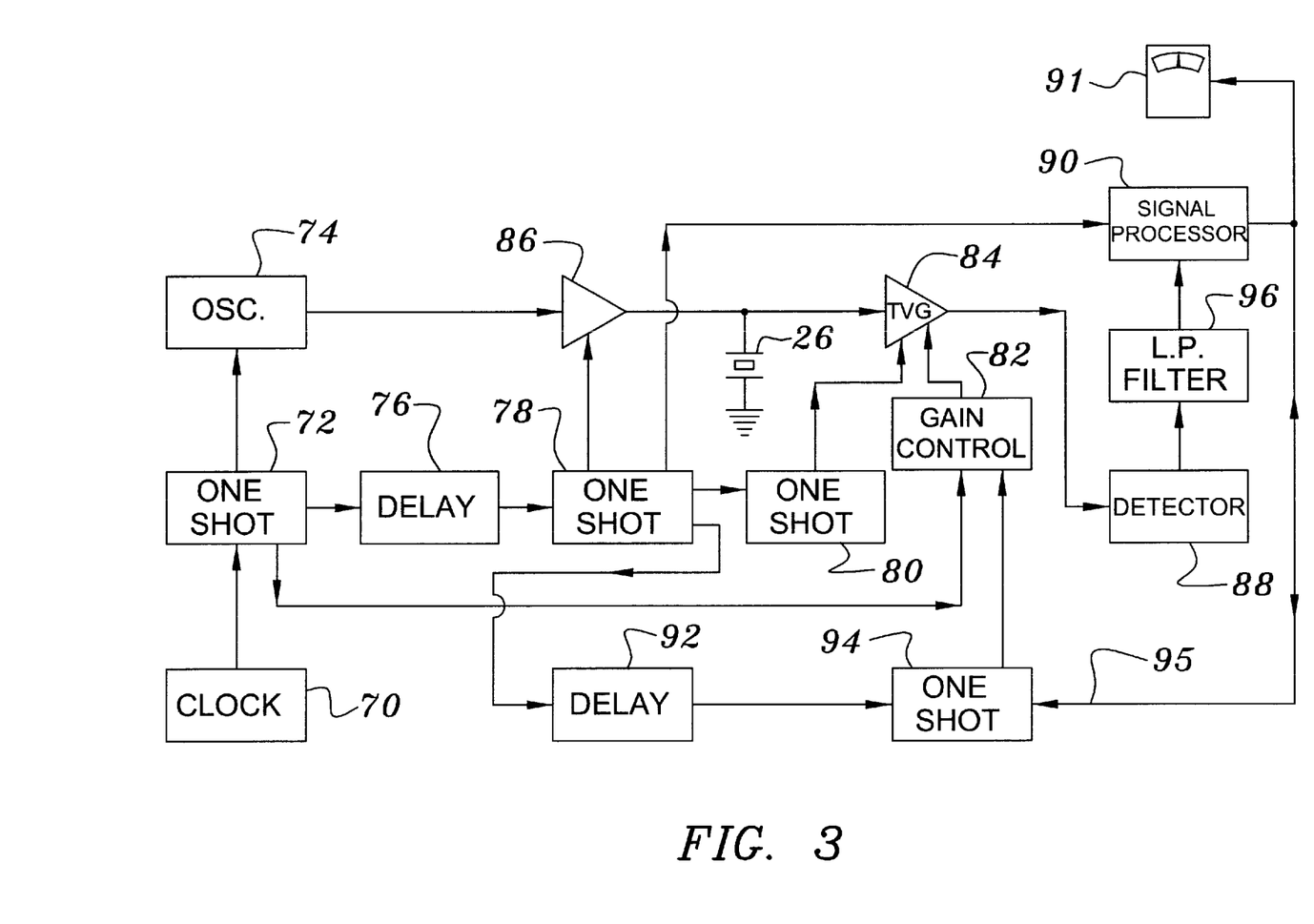
FIG. 3 illustrates a block diagram indicating the functional blocks of electronic circuitry in accordance with a preferred embodiment of the invention.

FIG. 3 is a block diagram of a representative electronic circuit for the present invention using the principles of ultrasonic distance detection as modified for application to the present invention. A clock 70 provides pulses to a one shot circuit 72, which controls both an oscillator 74 and a gain control circuit 82. The oscillator output is amplified by an amplifier 86 to energize the acoustic pulse-echo transducer 26, which is also connected to the input of the time variable gain amplifier (TVG) 84. The output pulse from the one shot circuit 72 also enters a delay circuit 76 and is then passed to a second one shot circuit 78. The second one shot 78 enables the amplifier 86 and also provides pulses to the signal processor 90, to a third one shot circuit 80 and through a second delay circuit 92 to a fourth one shot circuit 94 that provides a second input to the gain control circuit 82 of the TVG amplifier 84. The third one shot 80 output controls power to the TVG amplifier 84. The output signal from the TVG amplifier 84 is routed through a detector 88 and a low pass filter 96 to an input of the signal processor 90, which may be computer operating under control of a stored program, as is known in the control arts.

During distance measurement operation, the clock 70 provides pulses at a low frequency, for example 100 Hz, to the first one shot 72 which provides pulses at that same rate and of relatively short duration, for example 5 microseconds. These pulses control the operating period of the oscillator 74 which provides an output signal at a frequency, for example of 4 MHz. The output signal from the oscillator enters amplifier 86 to increase its magnitude, to provide oscillator isolation and for additional signal control. The pulse from the first one shot 72 also enters the first delay circuit 76 which delays it by a small amount, for example 2 microseconds, before activating the second one shot 78 which then provides a pulse, for example 3 microseconds wide, to the amplifier 86, in order to control its period of operation. By delaying the operation of the amplifier, an opportunity is provided for the oscillator to stabilize, so that the amplified 4 MHz signal burst applied to the transducer is uniform in frequency and magnitude. The amplifier is also active for a longer period (3 microseconds) than that of the 4 MHz burst signal in order to load the transducer and thereby reduce the period of its ringing after the burst signal has been removed. Reducing the duration of the ringing period allows the transducer to be used for receiving echoes very soon thereafter.

At the end of the pulse produced by the second one shot 78, the amplifier 86 is essentially disconnected from transducer 26 so that the signals it produces from echoes can enter the TVG amplifier 84 for further amplification. The amplifier gain control is initiated with the generation of the pulse from the first one shot 72, at which time the amplifier gain is so low as to make it essentially insensitive to the subsequently transmitted burst signals. The gain then increases with time so that the necessary amplification is available to amplify the signals from the echoes. Since these echo signals diminish greatly in magnitude with increasing distance between the transducer and the reflecting surface, a very large gain control range may be required for some applications. The TVG amplifier 84 may be designed to withstand the relatively large signal magnitude appearing at its front end during operation of the amplifier 86. Alternately, the TVG amplifier can be isolated from those signals by means of a switch (not shown).

At the trailing edge of the output pulse from the second one shot 78, the third one shot 80 is activated to produce a long duration pulse which controls the operating power to TVG amplifier 84. Thus, the TVG amplifier is powered only during the time when a valid echo may appear in order to reduce operating power. The output pulse from the second one shot 78 also enters the second delay circuit 92 which has a duration coinciding with an undesired echo, and triggers the fourth one shot 94 to produce a pulse applied to the gain control circuit in order to reduce the TVG amplifier gain by an amount required to neutralize that echo signal. The output from the fourth one shot 94 could alternatively have been applied to the detector 88 or signal processor 90, or could even control an attenuator (not shown) across the transducer 25, to neutralize the effects of an undesired echo.

The output from the TVG amplifier 84 enters detector 88 where the 4 MHz pulse envelope is amplitude detected and then passed through the low pass filter 96 to reduce the magnitude of the 4 MHz components prior to input to the signal processor 90. The processor 90 determines the time interval between the transmitted and the first echo pulse signals and produces the corresponding digital and/or analog signals for use by a suitable display device 91 or for subsequent processing. The processor may consist for example, of a simple two-state flip flop and a low pass filter where the one shot 78 triggers the flip flop into a high state while the echo signal from the low pass filter 96 returns the flip flop to its low state so that its average high state voltage, when smoothed by the low pass filter 96, is for example, indicated on a voltmeter calibrated in inches of insertion depth. The output from the flip flop could also be used to gate a high frequency carrier signal where the accumulated number of cycles per clock pulse are calibrated similarly for display and processing as desired.

As a further refinement, one can correct distance measurement errors resulting from changes in acoustic transit times in the fluid 42. These changes commonly arise from variations in temperature and changes in fluid composition, both of which can change the speed of sound in the fluid. The correction can be done by measuring a transit time corresponding to a known distance as a reference and compensating the depth measurement by a reciprocal of that transit time variation. For example, in a transit-time flowmeter the time interval required for the propagation of acoustic signals along a path of known length between two transducers 26, 60 can serve as such a reference. A calibration mode could be established just for the measurement of that interval, or the interval could be measured during a flow measurement mode of operation. If the interval were to increase to 150% of a nominal value, for example, the depth measurement determined by the signal processor 90, which is based on the nominal value of the speed of sound, would be multiplied by $\frac{2}{3}$ in order to obtain the correct depth. As another example applicable to time-of-flight probes, one could measure the time interval required for the propagation of acoustic signals between one of the transducers 26 and a leading edge of a reflector 58 (which could be angled so as to more efficiently reflect an acoustic signal from the transducer 26) during a depth measurement calibration mode. In this arrangement the signal processor 90 would operate to supply a control output 95 for switching between the calibration mode, in which the signal reflected back from the reflector's leading edge would be processed, and the depth measurement mode, in which case that signal would be rejected as previously discussed. This error compensation arrangement using known distances between elements of the probe can also be applied to flow measuring systems that do not use a time-of-flight sensor, e.g., the turbine flow meter depicted in FIG. 1. This can be done either by detecting incidental structural echoes arising from the pulse-echo transducer's 26 acoustic beam or by adding an additional transducer which may be a downward facing transducer (not shown) attached to a bottom surface of an upper support 18 and used to detect reflections from the lower support 20 portion of the probe.

Thus, a method of installing a fluid flow probe at a selected position within a pipe can thus comprise the steps of: a) inserting the probe and using a pulse-echo transducer mounted on the probe to determine the probe's position; b) moving the probe back and forth along its axis until an output from the distance measuring circuit indicates that the probe is nominally at the selected position; c) putting the instrument into a calibration mode in which the known distance between the pulse-echo transducer and a known structural element on the probe is used to determine the current actual speed of sound in the fluid; and d) repeating steps a) and b) while using the current actual speed of sound in order to accurately place the probe at the selected position. It will be understood that one could also choose to insert the probe, calibrate it for the then current actual speed of sound, and then move it to and fro until it attained the selected position.

Those skilled in the art can now appreciate from the foregoing description that the broad teachings of the present invention can be implemented in a variety of forms combining an electronic depth gauge with an insertion flow probe. For example, flow probes relying on the teachings of the present invention can be fabricated to operate gas environments such as steam. Therefore, while this invention has been described in connection with particular examples thereof, the true scope of the invention should not be so limited since other modifications will become apparent to the skilled practitioner upon a study of the drawings, specifications and claims.

What is claimed is:

1. In a flow sensor comprising a probe having an insertable end for insertion into a pipe, the probe comprising a flow sensing device for supplying an electrical flow signal responsive to a rate at which a fluid in the pipe flows past a portion of the probe adjacent the insertable end thereof, an improvement comprising a pulse-echo position sensing device comprising a single acoustic pulse-echo transducer disposed at a selected point on the probe for projecting an energetic acoustic beam and for detecting a reflected portion of the beam directly reflected from a selected portion of one of the pipe and a probe insertion fitting, the position sensing device operable to supply an electrical position signal output responsive to a distance between the selected point and the selected portion of the one of the pipe and a probe insertion fitting.

2. The improved flow sensor of claim 1 wherein the position sensing device is further operable to provide a second signal output responsive to a known distance between the pulse echo transducer and a selected portion of the probe distal from the pulse-echo transducer, the second signal output usable to determine a current speed of sound in the fluid.

3. The improved flow sensor of claim 1 wherein the flow sensing device comprises an acoustic time-of-flight sensing device comprising at least two transducers, one of the at least two transducers also comprising a portion of the pulse echo position sensing device.

4. The improved flow sensor of claim 1 wherein the position sensing device is operable to measure a distance between the selected point and the selected portion of the pipe.

5. The improved flow sensor of claim 4 wherein the distance measured comprises a distance between the selected point and a portion of the pipe diametrically across from the probe insertion fitting.

6. The improved flow sensor of claim 4 wherein the distance measured comprises a distance between the selected point and a portion of the pipe adjacent the probe insertion fitting.

7. In a flow sensor comprising a probe having an insertable end for insertion into a pipe, the probe comprising a flow sensing device for supplying an electrical flow signal responsive to a rate at which a fluid in the pipe flows past a portion of the probe adjacent the insertable end thereof, an improvement comprising a position sensing device comprising means disposed at a selected point on the probe for projecting an energetic beam and for detecting a reflected portion of the beam, wherein the position sensing device is operable to supply an electrical position signal output responsive to a distance, perpendicular to an axis of the probe, between the probe and one of a probe insertion fitting and a portion of the pipe abutting an opening into which the probe insertion fitting is inserted.

8. The improved flow sensor of claim 7 wherein the position sensing device comprises an acoustic transducer.

9. The improved flow sensor of claim 7 wherein the position sensing device comprises a photoelectric emitter and a photoelectric detector.

10. The improved flow sensor of claim 7 wherein the probe insertion fitting comprises a portion of the flow sensor.

11. A method of positioning a flow probe within a pipe in which a fluid is flowing, the probe having an electrical flow signal output representative of a rate of flow of the fluid past a selected portion of the probe adjacent an insertable end thereof, the method comprising the steps of:
  a) inserting the insertable end of the probe into the pipe,
  b) energizing a pulse-echo position sensor to project an ultrasonic beam from a selected point adjacent the selected portion of the probe;
  c) receiving an echo portion of the ultrasonic beam with the pulse-echo position sensor and providing an electrical position signal output responsive to a distance between the position sensor and a selected portion of the pipe;
  d) supplying the electrical position signal to a display apparatus for displaying to an operator an indication of the distance; and
  e) moving the probe within the pipe until the indication of the distance achieves a selected value.

12. The method of claim 11 wherein the distance is measured between the selected point and a surface of the pipe diametrically across the pipe from a probe insertion fitting through which the probe is inserted.

13. The method of claim 11 wherein the distance is measured between the selected point and a portion of a probe insertion fitting through which the probe is inserted.

14. The method of claim 11 comprising an additional calibration step in which the transducer has a second signal output responsive to a known distance between the ultrasonic transducer and a selected portion of the probe distal from the transducer, the second signal output usable to determine a current value of a speed of sound in the fluid.

15. The method of claim 11 wherein the electrical position signal changes when the selected point passes from an insertion fitting into the pipe.

16. The method of claim 11 wherein the display apparatus comprises a visual display.

17. The method of claim 11 wherein the step of energizing the position sensor is carried out prior to inserting the probe into the pipe.

18. An apparatus for selectively making one of a pulse-echo distance measurement in a fluid and a time-of flight measurement of a rate at which the fluid flows, the apparatus comprising a probe operable to selectively provide at least a time-of-flight flow output and a pulse-echo distance output, the probe having an insertable end for insertion into a pipe in which the fluid flows, the probe comprising:
  a first acoustic transducer comprising at least one transducer element, the first acoustic transducer selectively operable to generate a first acoustic beam directed at an acoustic transducer array and to both receive at least a portion of a second acoustic beam generated by the acoustic transducer array and to provide a first time-of-flight flow output therefrom; and
  the acoustic transducer array comprising a plurality of acoustic transducer elements, the acoustic transducer array selectively operable to:
    a) generate the second acoustic beam directed at the first acoustic transducer;
    b) receive at least a portion of the first acoustic beam and provide a second time-of-flight flow output therefrom;
    c) generate a third acoustic beam not directed at the first acoustic transducer, the third acoustic beam directed at a portion of the pipe when the probe is installed therein; and
    d) receive a portion of the third acoustic beam and provide the pulse-echo output therefrom.

19. The apparatus of claim 18 further comprising a reflecting surface disposed in a path between the first transducer and the acoustic transducer array for reflecting the first and second acoustic beams.

20. The apparatus of claim 18 wherein the acoustic transducer array comprises a piezoelectric material having a first electrode disposed on one surface thereof and having a plurality of separately addressable electrodes disposed on a second surface thereof so that each of the separately addressable electrodes is separated from the first electrode by a thickness of the piezoelectric material.

* * * * *